(12) United States Patent
Nakai et al.

(10) Patent No.: US 7,869,597 B2
(45) Date of Patent: Jan. 11, 2011

(54) METHOD AND SYSTEM FOR SECURE PACKET COMMUNICATION

(75) Inventors: Shinji Nakai, Yokohama (JP); Masakazu Satoh, Tokyo (JP); Kazunari Suzuki, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 11/600,480

(22) Filed: Nov. 16, 2006

(65) Prior Publication Data

US 2007/0116285 A1    May 24, 2007

(30) Foreign Application Priority Data

Nov. 21, 2005   (JP)   .............................. 2005-335916

(51) Int. Cl.
H04K 1/00 (2006.01)
(52) U.S. Cl. .................................................... 380/255
(58) Field of Classification Search .................. 380/255
See application file for complete search history.

(56) References Cited

U.S. PATENT DOCUMENTS

| | | | |
|---|---|---|---|
| 5,799,089 A | | 8/1998 | Kühn et al. |
| 7,240,202 B1* | | 7/2007 | Orman ........................ 713/169 |
| 2003/0065944 A1 | | 4/2003 | Mao et al. |
| 2004/0139336 A1 | | 7/2004 | McLean et al. |
| 2004/0184479 A1* | | 9/2004 | Yamauchi et al. ............ 370/466 |

FOREIGN PATENT DOCUMENTS

| | | |
|---|---|---|
| JP | 11-027322 | 1/1999 |
| JP | 2000-315997 | 11/2000 |
| JP | 2004-104439 | 4/2004 |
| JP | 2004-166153 | 6/2004 |
| JP | 2004-215253 | 7/2004 |
| JP | 2005-223874 | 8/2005 |
| WO | WO03030004 A1 | 4/2003 |
| WO | WO03052630 A2 | 6/2003 |

OTHER PUBLICATIONS

Information technology—Security techniques—Modes of operation for an *n*-bit block cipher; International Standard; Reference No. ISO/IEC 10116:1997(E); 8 pages.

* cited by examiner

*Primary Examiner*—Benjamin E Lanier
*Assistant Examiner*—Cordelia Zecher
(74) *Attorney, Agent, or Firm*—Schmeiser, Olsen & Watts; William H. Steinberg

(57) ABSTRACT

A method for processing a communication data item. The communication data item is divided into at least two unencrypted packets to be encrypted. Each encrypted packet is generated from a corresponding unencrypted packet. Each unencrypted packet has a packet header and plaintext data. The packet header has an identifier field that includes a packet identifier. The packet identifier is identical for all unencrypted packets. Generating an encrypted packet for each unencrypted packet includes: determining a vector identifier from the identical packet identifier, wherein the vector identifier is associated with the identical packet identifier; ascertaining an initial vector from the vector identifier; and forming an encrypted packet header by inserting the vector identifier into a first portion of the packet header and encrypting a second portion of the packet header through use of the initial vector. The encrypted packets are subsequently decrypted and combined to reconstruct the communication data item.

20 Claims, 9 Drawing Sheets

METHOD AND SYSTEM FOR SECURE PACKET COMMUNICATION

FIELD OF THE INVENTION

The present invention relates to a communication method and system for encrypting and decrypting packets, such as an Internet Protocol (IP) packets, to ensure confidentiality and efficiency of communication.

BACKGROUND OF THE INVENTION

With widespread use of a wide-area Ethernet service, an encryption apparatus in layer 3 (the network layer of the Open Systems Interconnection (OSI) reference model) and an encryption apparatus in layer 2 (the link layer of the OSI reference model) have become used. However, it may be difficult to apply Cipher Block Chaining (CBC) encryption to the apparatus in layer 2. Moreover, when CBC is applied to a communication apparatus, a communication frame size may be increased which causes a decrease in communication speed.

Accordingly, there is a need for a method and system that enhances confidentiality of information in cryptographic communication without increasing the communication frame size or processing time.

SUMMARY OF THE INVENTION

The present invention provides a method for processing a communication data item, said method comprising dividing the communication data item into a plurality of unencrypted packets and generating an encrypted packet from each unencrypted packet, each unencrypted packet having a packet header and plaintext data, the packet header of each unencrypted packet comprising an identifier field that includes a packet identifier, the packet identifier being identical for all unencrypted packets of the plurality of unencrypted packets, said generating comprising for each unencrypted packet:

determining a vector identifier from the identical packet identifier, said vector identifier having an association with the identical packet identifier;

ascertaining an initial vector from the vector identifier; and forming an encrypted packet header, said forming the encrypted packet header comprising inserting the vector identifier into a first portion of the packet header and encrypting a second portion of the packet header through use of an encryption key, said first and second portions of the packet header being different portions of the packet header, said encrypting the second portion of the packet header being implemented through use of the initial vector.

The present invention provides a method for processing a plurality of encrypted packets, said method comprising generating a decrypted packet from each encrypted packet, each encrypted packet having an encrypted packet header and encrypted data items, the encrypted packet header of each encrypted packet comprising an encrypted portion ($E_0$) and an identifier field that includes a vector identifier, said vector identifier being identical for all encrypted packets of the plurality of encrypted packets, said encrypted packets having been previously derived from a communication data item that comprised unencrypted packets respectively corresponding to the encrypted packets, said generating comprising for each encrypted packet:

obtaining the vector identifier from the identifier field;
ascertaining an initial vector from the obtained vector identifier;

decrypting $E_0$ to form a decrypted data item $D_0$; and
performing an exclusive OR between $D_0$ and the initial vector to form a decrypted packet header of the decrypted packet.

The present invention enhances confidentiality of information in cryptographic communication without increasing the communication frame size or processing time.

DETAILED DESCRIPTION OF THE INVENTION

The present invention provides a communication method and apparatus for communicating data packets including an identifier field in the headers of the data packets. The communication apparatus comprises a packet encryption unit for generating an encrypted packet by using a predetermined initial vector to encrypt one data packet, and a vector writing unit for recording a vector identifier identifying the initial vector in at least a part of an identifier field in the encrypted packet. The identifier field is used for storing, in response to division of a data communication item (i.e., the original data packet) into a plurality of divided data packets, identical packet identifiers in the headers of the divided data packets The present invention provides a communication method and apparatus for communicating data packets including an identifier field in the headers of the data packets. The communication apparatus comprises an identifier acquiring unit for acquiring, from at least a part of an identifier field which is provided in a header of an encrypted packet obtained by encrypting one data packet and which, in response to division of the original data packet into a plurality of divided data packets, is used for storing identical packet identifiers in the headers of the divided data packets, a vector identifier identifying an initial vector having been used in encryption of the data packet, and a packet decryption unit for generating decrypted data by performing decryption of the encrypted packet by using the initial vector identified by the vector identifier.

Figure 1:
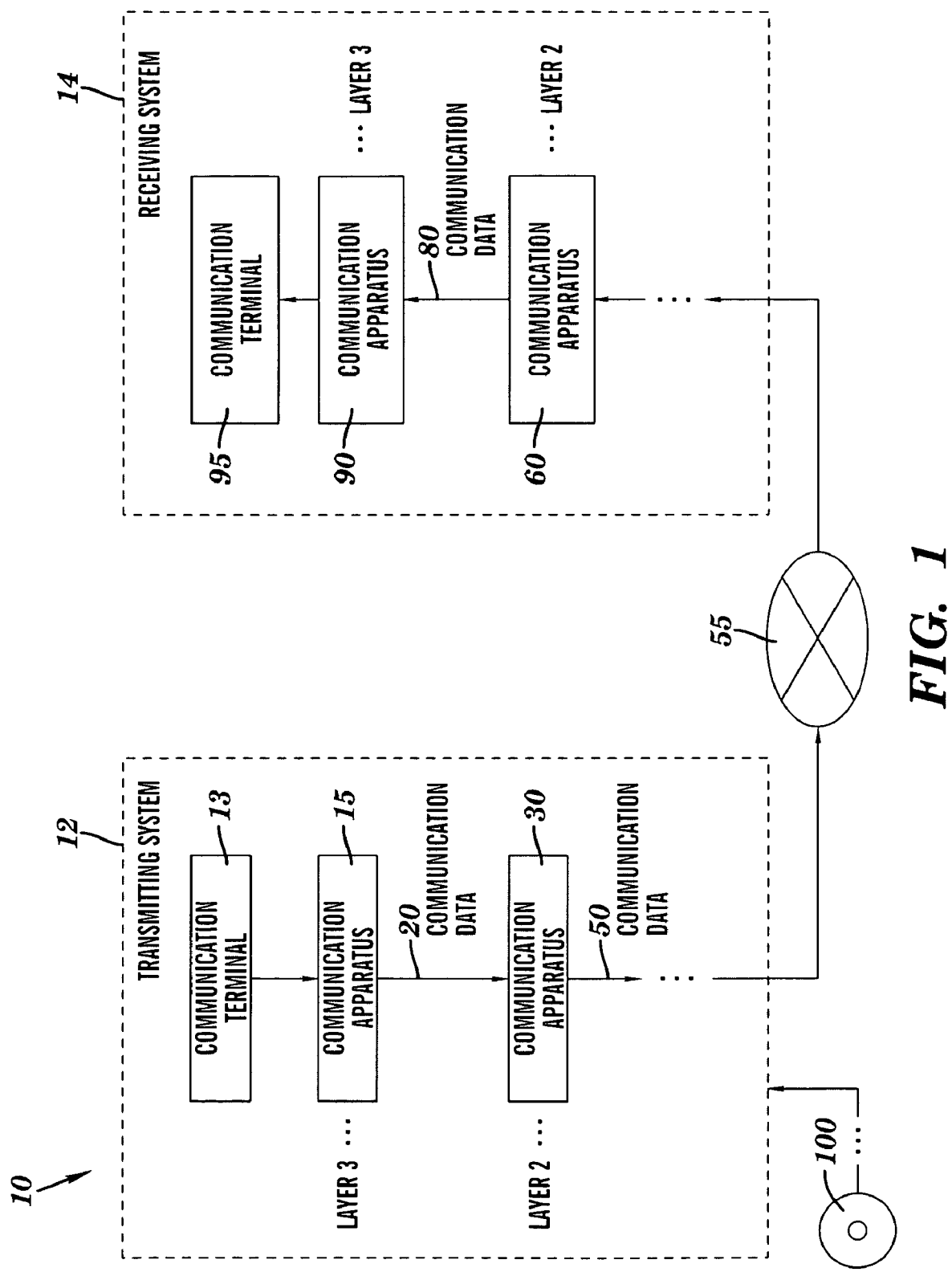
FIG. 1 shows an information processing system comprising a transmitting system and a receiving system, in accordance with embodiments of the present invention.

FIG. 1 shows an information processing system 10 comprising a transmitting system 12 and a receiving system 14, in accordance with embodiments of the present invention. The transmitting system 12 includes a communication terminal 13, a communication apparatus 15 having a communication function based on layer 3 (the network layer in the Open Systems Interconnection (OSI) reference model), and a communication apparatus 30 having a communication function based on layer 2 (the data link layer in the OSI reference model). In order to communicate with a communication terminal 95 in the receiving system 14, the communication terminal 13 transmits a data packet to the communication apparatus 15. The communication apparatus 15 controls communication on the basis of, for example, the Internet Protocol (IP). Specifically, after receiving the data packet from the communication terminal 13, the communication apparatus 15 writes, in an IP packet header, information for controlling IP communication, for example, information such as a destination IP address, and transmits the data packet having information written therein to the communication apparatus 30. The data packet transmitted to the communication apparatus 30 is represented by the communication data 20.

The communication apparatus 30 controls communication using media access control (MAC) addresses. After receiving the communication data 20 from the communication apparatus 15, the communication apparatus 30 writes information, such as a MAC address of a destination (said destination being the communication apparatus 60 of the receiving system 14), in a MAC header. Also, the communication apparatus 30 encrypts at least a part of the communication data 20. This encrypted data can be decrypted by the communication apparatus 60. Communication data generated in such a manner is represented by communication data 50. The communication data 50 is transmitted to the receiving system 14 via a network 55.

The communication terminal 13 in this embodiment is, for example, one of various types of servers such as a personal computer, a file server, and a print server, or is a PDA or the like. Also, the communication apparatus 15 is a layer-3 switch called a router or gateway. The communication apparatus 30 is a layer-2 switch called a bridge or the like.

In addition, the personal computer or the like, or each switch or the like, may be controlled by a computer program recorded on a CD-ROM 100. This computer program comprises computer readable program code and allows a processor provided in the personal computer or the like, or in the switch or the like, to function as the communication terminal 13, the communication apparatus 15 and/or the communication apparatus 30 in the transmitting system 12. Furthermore, this computer program may allow the processor to further function as the communication terminal 95, the communication apparatus 60 and/or the communication apparatus 90 in the receiving system 14. After being read from the CD-ROM 100, this computer program is transmitted to the transmitting system 12 or the receiving system 14, and the transmitted computer program is installed and executed in the transmitting system 12 or the receiving system 14.

The above-described computer program may be stored in an external computer readable storage medium. The computer readable storage medium may comprise the CD-ROM 100, an optical recording medium such as a flexible disc, a DVD, a PD, a magneto-optical recording medium such as an MD, a tape medium, a semiconductor memory such as an IC card, etc. In addition, by using as a computer readable recording medium, a storage device (e.g., a hard disk, RAM, etc.) provided in a server system connected to a dedicated communication network or the Internet, the computer program may be provided to the transmitting system 12 via the network.

The receiving system 14 includes the communication apparatus 60 which has a layer-2 communication function, the communication apparatus 90 which has a layer-3 communication function, and a communication terminal 95. The communication apparatus 60 controls communication using MAC addresses, and functions as a MAC frame receiving apparatus in this embodiment. Specifically, on the basis of information written in the MAC header, the communication apparatus 60 acquires a MAC frame to be relayed by the communication apparatus 60. For example, the communication apparatus 60 receives the communication data 50 from the communication apparatus 30 via the network 55. Also, the communication apparatus 60 decrypts a portion of the communication data 50 which is encrypted by the communication apparatus 30. Communication data generated in such a manner is represented by communication data 80. The communication apparatus 90 receives the communication data 80 from the communication apparatus 60 and transmits the received communication data 80 to the communication terminal 95.

As described above, the information processing system 10 according to embodiments of the present invention is intended to realize cryptographic communication in layer 2. In this case, the information processing system 10 is intended to enhance confidentiality of information in cryptographic communication by applying Cipher Block Chaining (CBC) or the like without increasing a processing time necessary for encryption.

In this embodiment, the transmitting system 12 and the receiving system 14 are described as separate systems. However, one system may further have a function of the other system. In other words, either of the transmitting system 12 and the receiving system 14 may function as an IP-packet transmitting/receiving system.

Figure 2:
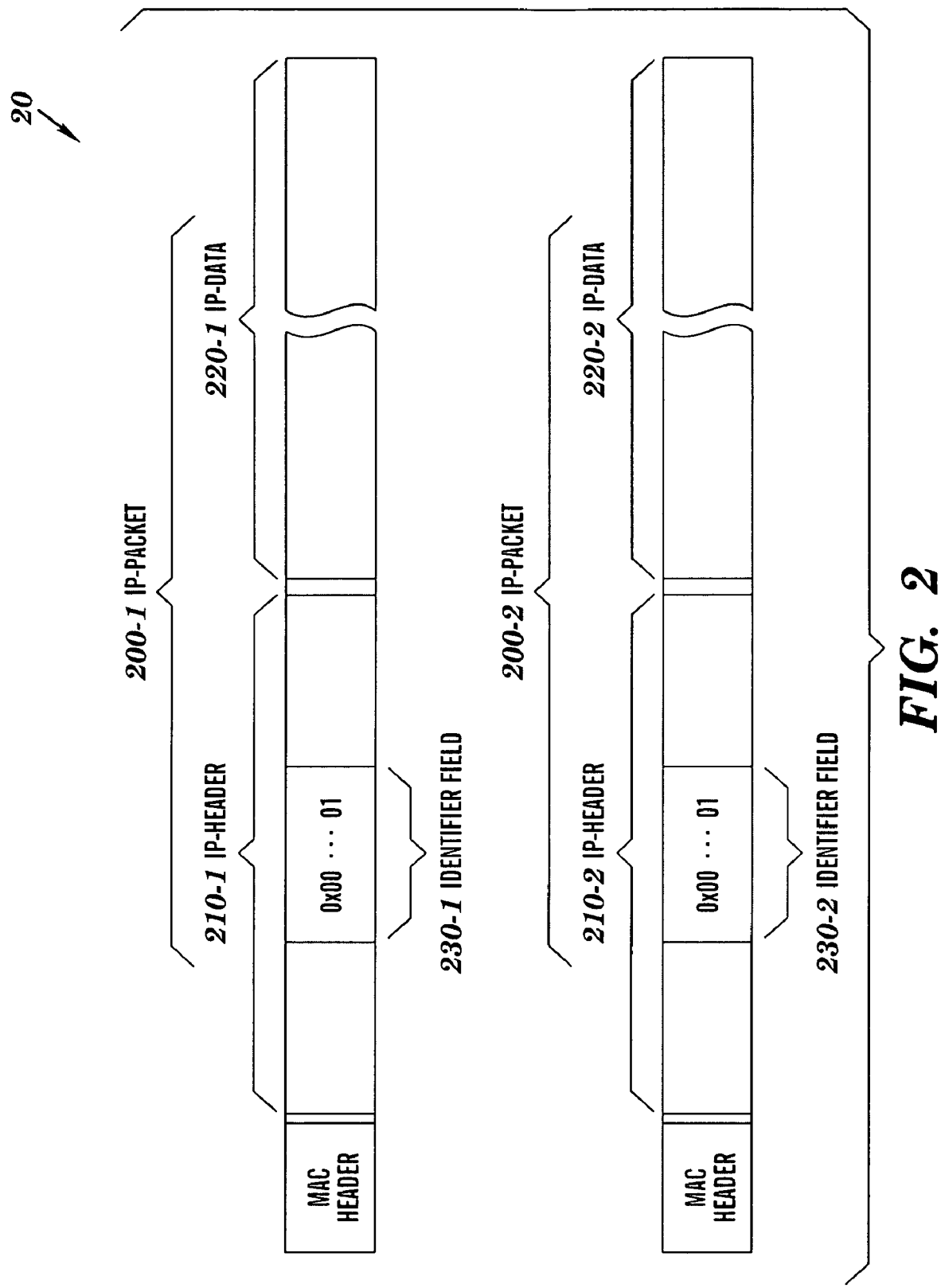
FIG. 2 shows specific examples of unencrypted communication data in the transmitting system of FIG. 1, in accordance with embodiments of the present invention.

FIG. 2 shows specific examples of the unencrypted communication data 20 in the transmitting system 12 of FIG. 1, in accordance with embodiments of the present invention. The communication data 20 includes a MAC frame having an IP packet 200-1 as a payload and a MAC frame having an IP packet 200-2 as a payload. The individual IP packets 200-1 and 200-2 are generated from a communication data item, namely from an original packet that comprises the IP packets 200-1 and 200-2. For example, when the size of communication data received by the communication apparatus 15 from the communication terminal 13 (see FIG. 1) exceeds an MTU (Maximum Transmission Unit), the communication apparatus 15 generates the IP packets 200-1 and 200-2 by dividing the communication data item (i.e., the original packet) into its constituent IP packets comprising IP packets 200-1 and 200-2.

The IP packet 200-1 includes an IP packet header 210-1 and IP plaintext-data 220-1. The IP packet 200-2 includes an IP packet header 210-2 and IP plaintext-data 220-2. Each of the IP packet headers 210-1 and 210-2 includes various types of control information such as a destination IP address. The IP packet header 210-1 includes an identifier field 230-1, and the IP packet header 210-2 includes an identifier field 230-2. The identifier field 230-1 is a field for recording a packet identifier of the IP packet 200-1. The identifier field 230-2 is a field for recording a packet identifier of the IP packet 200-2. In response to division of an IP packet into a plurality of divided IP packets, identical packet identifiers are stored in the identifier fields of the divided IP packets. Accordingly, the identifier fields 230-1 and 230-2 store identical packet identifiers.

Figure 5:
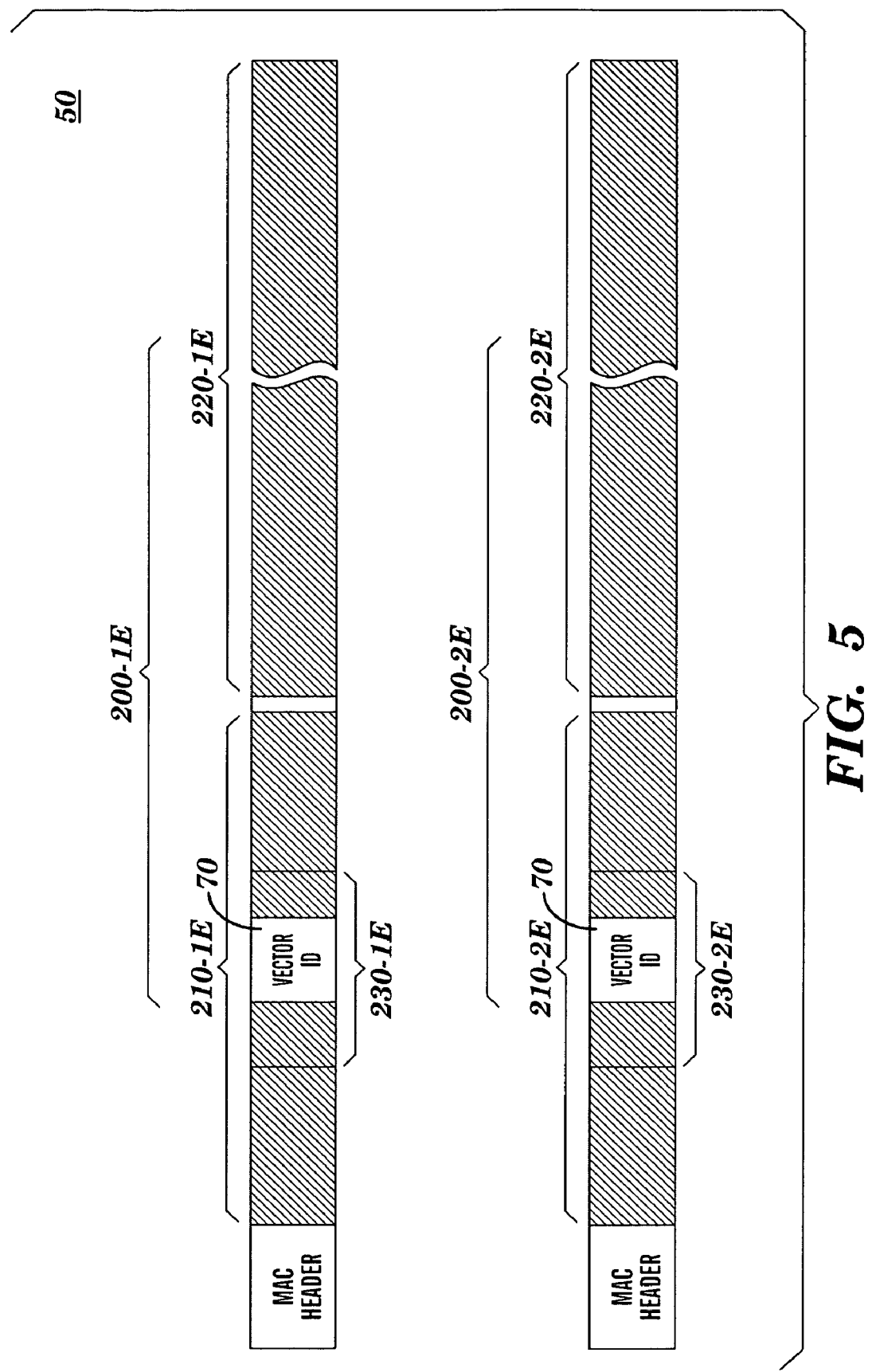
FIG. 5 shows specific examples of encrypted communication data in the transmitting system of FIG. 1, in accordance with embodiments of the present invention.
Figure 8:
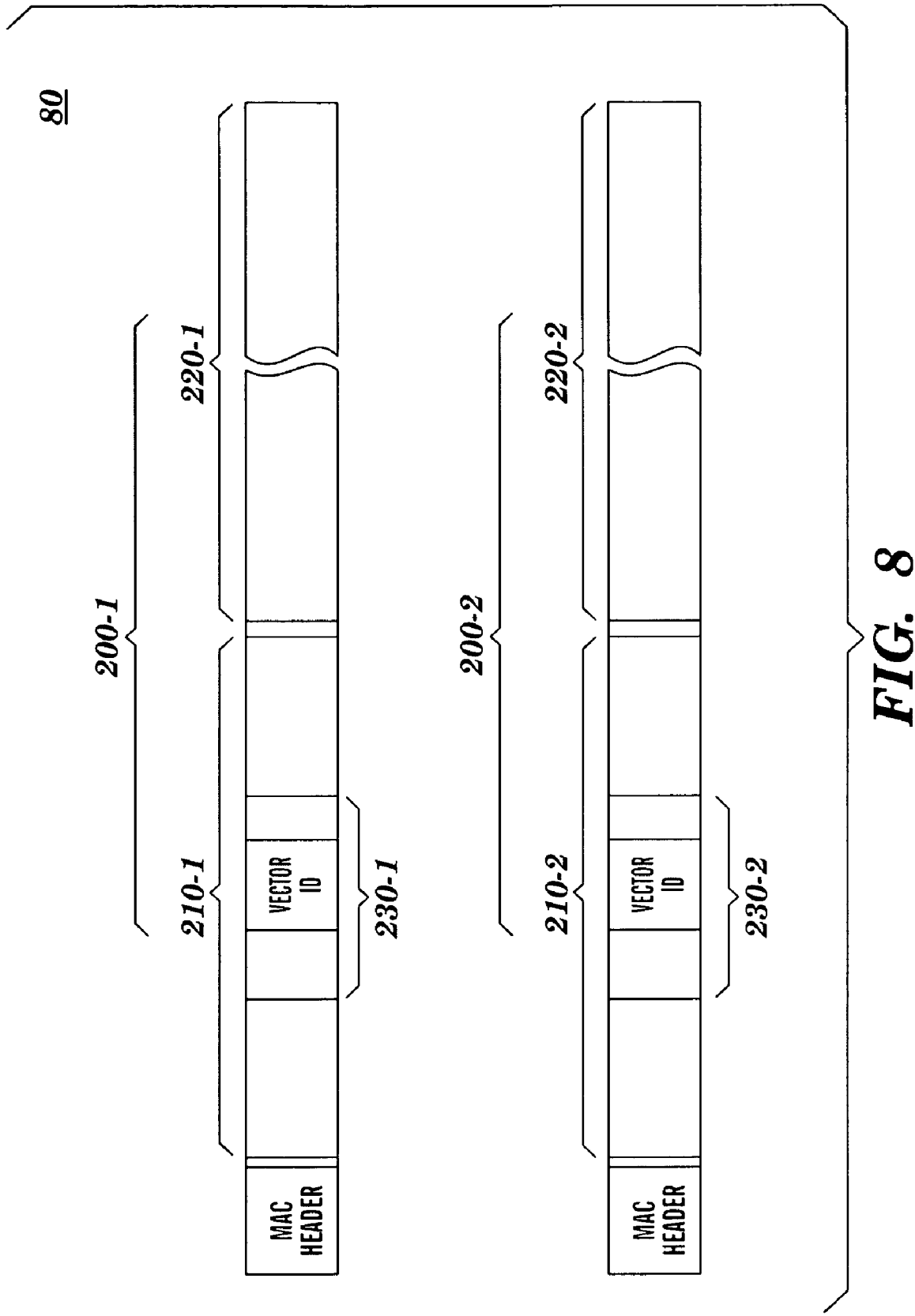
FIG. 8 shows specific examples of unencrypted communication data in the receiving system of FIG. 1, in accordance with embodiments of the present invention.

In FIGS. 5 and 8 as well as FIG. 2, packet portions other than the portions required for describing processing of layers 2 and 3 are omitted. Specifically, the IP packet 200-1 may further include error-detecting/correcting data such as Cyclic Redundancy Code (CRC) or a packet trailer corresponding to the packet header, in addition to the portions in FIG. 2. Their descriptions are omitted.

Figure 3:
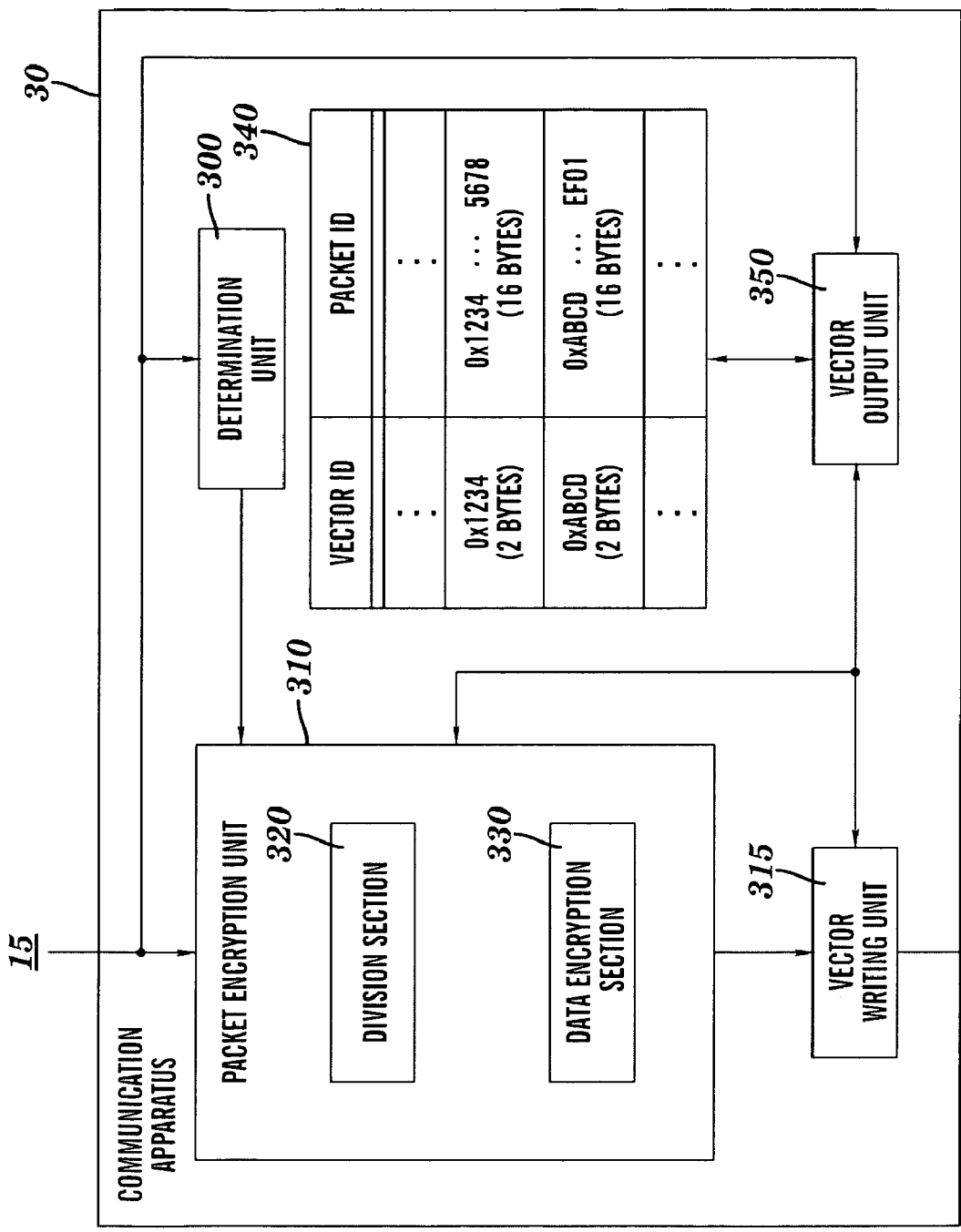
FIG. 3 shows a functional configuration of a communication apparatus in the transmitting system of FIG. 1, in accordance with embodiments of the present invention.

FIG. 3 shows a functional configuration of the communication apparatus 30 in the transmitting system 12 of FIG. 1, in accordance with embodiments of the present invention. The communication apparatus 30 has not only the function of controlling layer-2 communication, but also functions as shown in FIG. 3. The communication apparatus 30 includes a determination unit 300, a packet encryption unit 310, a vector writing unit 315, a storage unit 340, and a vector output unit 350. The determination unit 300 determines whether a payload of a MAC frame to be transmitted to the communication apparatus 60 is an IP packet using the IP protocol. When the MAC frame is in accordance with an Ethernet frame format, the determination unit 300 may determine whether the payload is an IP packet, on the basis of the value of a "type" field. On the condition that the payload of the MAC frame is an IP packet, the packet encryption unit 310 encrypts the IP packet to generate an encrypted packet.

In this encryption, a predetermined initial vector is used. The packet encryption unit 310 includes a division section 320 and a data encryption section 330. The division section 320 sequentially divides the IP packet into a plurality of divided data items each having a predetermined size. Next, the data encryption section 330 uses the initial vector to encrypt one divided data item. The data encryption section 330 further encrypts the next divided data item by using the encrypted data item as the next vector. As a result, the data encryption section 330 can encrypt the divided data items to generate a plurality of encrypted data items.

The vector writing unit 315 records a vector identifier identifying the initial vector in at least a part of a predetermined field provided in an IP packet header of the encrypted packet generated as described above. This predetermined field is specifically a field that stores information for reconfiguring the original IP packet from the divided IP packets. By way of example, this field is the identifier field 230-1 shown in FIG. 2. The identifier field 230-1 is a reserved field for IP packet division, even if an IP packet is divided or not divided. In other words, the vector writing unit 315 records the vector identifier in the identifier field 230-1 regardless of whether an IP packet is divided or not divided.

Instead, the predetermined field in which the vector identifier is stored may be a field for storing a fragment offset of the IP packet. In addition, in the predetermined field, the vector identifier is recorded by a method that does not increase the size of the IP packet. For example, information already recorded in the predetermined field may be overwritten by the vector identifier, and the information already recorded in the predetermined field may be converted on the basis of the vector identifier. In addition, the predetermined field may be a field which does not transfer a value to an apparatus in a layer above layer 3 (the network layer). This can prevent layer-2 cryptographic communication from interfering with communication in a different layer.

The storage unit 340 stores, for an already encrypted IP packet, a packet identifier (packet ID) having been stored in an identifier field in the IP packet, and a vector identifier (vector ID) identifying an initial vector having been used in encryption of the IP packet so that both are associated with each other. In the example in FIG. 3, the storage unit 340 stores a packet ID of 0×1234 . . . 5678 so as to be associated with a vector ID of 0×1234. Preferably, the storage unit 340 deletes the association between the stored packet identifiers and initial vectors with predetermined timing or periodically. This can prevent an increase in the required storage amount of the storage unit 340 and can increase vector identifier searching speed. By way of example, the predetermined timing may be timing with which an encryption key set between the communication apparatuses 30 and 60 is changed.

In response to reception of the IP packet by the communication apparatus 30, the vector output unit 350 regards the IP packet as a new IP packet to be encrypted, and searches the storage unit 340 for a vector identifier corresponding to a packet identifier of the IP packet. On the condition that this vector identifier is searched for, that is, on the condition that this vector identifier is stored in the storage unit 340, the vector output unit 350 outputs the initial vector corresponding to the vector identifier, as an initial vector for use in IP-packet encryption. The packet encryption unit 310 uses this initial vector to perform the above-described encryption.

Also, the vector output unit 350 outputs the found vector identifier to the vector writing unit 315. The vector writing unit 315 records this vector identifier in the IP packet header. In the above-described processing, the identical vector identifiers are recorded in IP packets having identical packet IDs. This allows, for example, the identifier fields 230-1 and 230-2 to be identical in recorded content, thus enabling reconfiguration of the IP packet by the receiving system 14.

On the condition that the vector identifier is not searched for, the vector output unit 350 may generate an initial vector based on the vector identifier newly generated by using a predetermined pseudo-random number or the like. The generated vector identifier and initial vector are similarly outputted to the vector writing unit 315 and the packet encryption unit 310.

Figure 4:
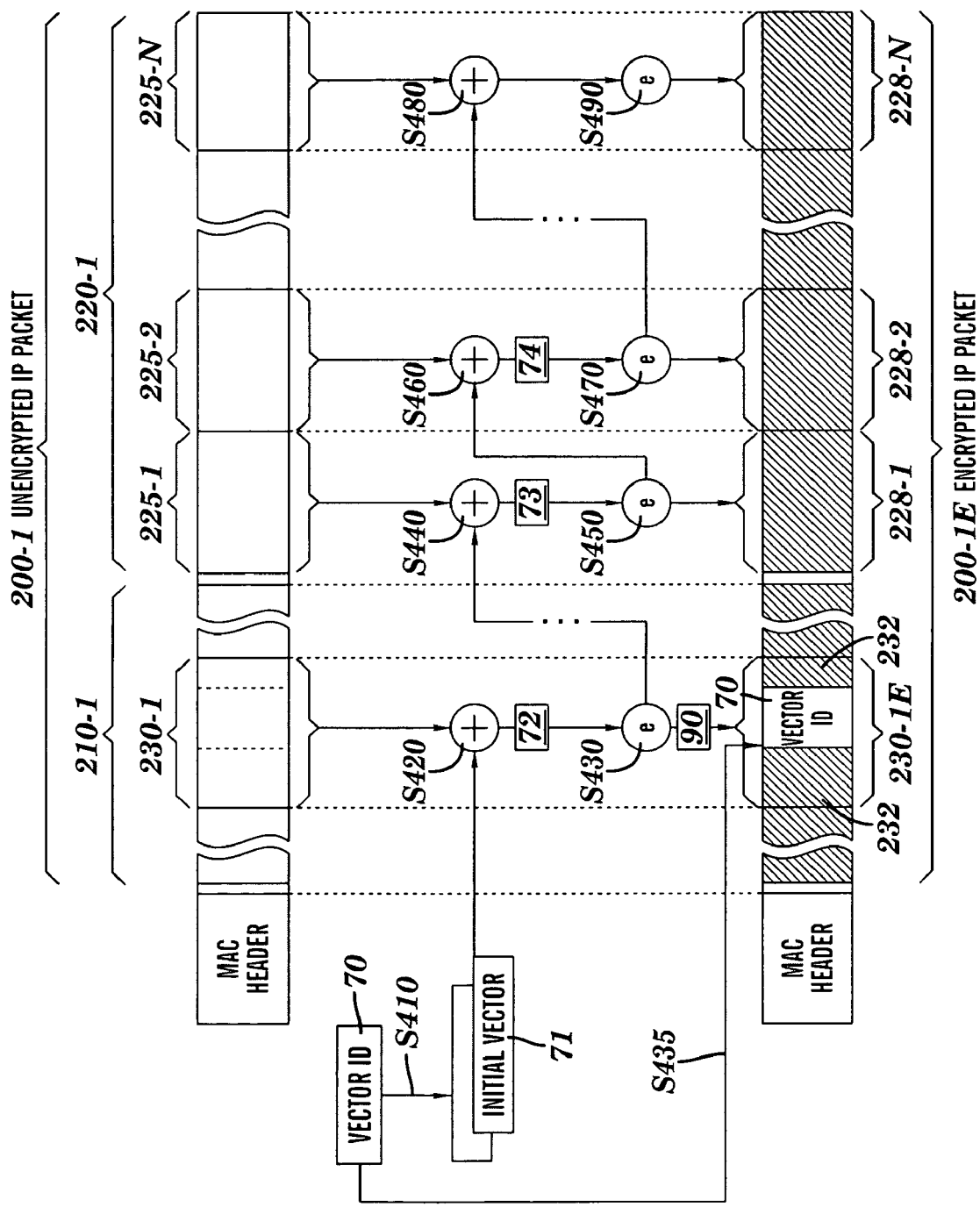
FIG. 4 illustrates a process in which an Internet Protocol (IP) packet is encrypted by the communication apparatus of FIG. 3, in accordance with embodiments of the present invention.

FIG. 4 illustrates a process in which the IP packet 200-1 is encrypted by the communication apparatus 30 of FIG. 3, in accordance with embodiments of the present invention. In the upper part of FIG. 4, the IP packet 200-1, which is unencrypted in a state prior to encryption, is shown. In the lower part of FIG. 4, the encrypted packet 200-1E, which is in an encrypted state, is shown. Since the communication apparatus 30 encrypts the IP packet 200-1 in layer 2, the IP packet 200-1 in this embodiment further includes a MAC header in addition to the IP packet 200-1 in FIG. 2. The data size of the MAC header may be for example, 6 bytes. The IP packet 200-1 comprises an IP packet header 210-1 and IP plaintext-data 220-1.

First, the division section 320 sequentially divides the IP packet 200-1 into a plurality of divided data items each having a predetermined size. For example, the divided data items obtained by dividing the IP data 220-1 are represented by plaintext-data items 225-1 to 225-N, wherein N is at least 1. Divided data items are generated also from the IP packet header 210-1. Next in step S410, the vector output unit 350 generates an initial vector 71 on the basis of the vector identifier (ID) 70 or a pseudo-random number. Processing that generates the initial vector 71 from the vector ID 70 is realized by, for example, applying a predetermined hash function to the vector ID 70.

Next, the data encryption section 330 sequentially encrypts the divided data items in the IP packet header 210-1 by using the initial vector 71. For example in step S420, the data encryption section 330 implements the exclusive OR operation between one divided data item in the IP packet header 210-1 and the initial vector 71 to generate a resulting data item 72 In step S430, the data encryption section 330 generates an encrypted data item 90 by encrypting the resulting data item 72 of the exclusive OR operation performed step S420, using a predetermined encryption key. The encrypted data item 90 becomes the encrypted part 232 of the identifier field 230-1E. In step S435, the packet encryption unit 310 replaces the identifier field 230-1 in the IP packet 200-1 by the vector ID 70, and the packet encryption unit 310 may encrypt a part of the IP packet 200-1 other than identifier field 230-1. The packet encryption unit 310 may replace the entirety of the identifier field 230-1 by the vector ID 70, or may replace only a part of the identifier field 230-1 by the vector ID 70. In the case that the part of the identifier field 230-1 is replaced (as shown in FIG. 4), the packet encryption unit 310 may encrypt a part of the packet header other than the replaced part, resulting in an encrypted part of the IP packet header 210-1 in addition to the encrypted part 232 of the identifier field 230-1E in the encrypted packet 200-1E.

Instead, the packet encryption unit 310 may replace not the IP packet 200-1 of plaintext data but the result of the exclusive OR operation implemented in step S420 by the initial vector 71. In other words, the packet encryption unit 310 may replace a part corresponding to the identifier field 230-1 in the result of the exclusive OR operation implemented in step S420 by the initial vector 71. Also, in this configuration, a vector ID 70 can be obtained at the time the encrypted data item is decrypted, and the initial vector 71 for use in the exclusive OR operation on decryption can be obtained.

From the preceding discussion, the present invention includes various embodiments relating to the packet header 210-1, the identifier field 230-1 of the packet header 210-1, the location of the vector ID 70 in the packet header portion of the encrypted packet 200-1E, and the portion of the packet header 210-1 that is encrypted (e.g., in step S430). Generally, the packet header 210-1 comprises a first portion and a second portion, wherein the vector ID 70 is inserted into the first portion of the packet header 210-1 (e.g., in step S435), and wherein the second portion of the packet header 210-1 is encrypted (e.g., in step S430). The first and second portions of the packet header 210-1 are different portions of the packet header 210-1.

In one embodiment, the identifier field comprises the first portion of the packet header. In one embodiment, the identifier field consists of the first portion of the packet header. In one embodiment, the identifier field consists of the first portion of the packet header and the second portion of the packet header. In one embodiment, the packet header comprises the first portion of the packet header, the second portion of the packet header, and at least one additional portion (e.g., a third portion) of the packet header. In one embodiment, the second portion of the packet header has a first part that is in the identifier field and a second part that is outside of the identifier field. In one embodiment, the second portion of the packet header is entirely outside of the identifier field. In one embodiment, the first portion of the packet header is entirely outside of the identifier field. In one embodiment, the packet header consists of the first portion of the packet header and the second portion of the packet header.

After encryption of the IP packet header 210-1 is completed, the data encryption section 330 encrypts a plaintext-data item 225-1 by using the last encrypted data item 90 as a vector. In step S440, the data encryption section 330 implements the exclusive OR operation between the next vector (i.e., the encrypted data item 90 resulting from step S430) and the plaintext-data item 225-1 to generate a resulting data item 73. In step S450, the data encryption section 330 generates an encrypted data item 228-1 by encrypting the resulting data item 73 of the exclusive OR operation performed step S440, using a predetermined encryption key.

Next, the data encryption section 330 encrypts a plaintext-data item 225-2 following the plaintext-data item 225-1 by using the encrypted data item 228-1 resulting from step S450 as the next vector. Specifically in step S460, the data encryption section 330 implements the exclusive OR operation between the next vector (i.e., the encrypted data item 228-1 resulting from step S450) and the plaintext-data item 225-2 to generate a resulting data item 74. In step S470, the data encryption section 330 generates an encrypted data item 228-2 by encrypting the resulting data item 74 of the exclusive OR operation performed step S460, using a predetermined encryption key.

After generation of the encrypted data item 228-2, by repeatedly performing encryption, the data encryption section 330 finally generates an encrypted data item 228-N in steps S480 and S490.

The preceding description of FIG. 4 for the encryption of the packet header 210-1 and the plaintext-data items 225-1, 225-2, ..., 225-N may be described as follows. As stated supra, the packet header comprises a first portion and a second portion, wherein the vector ID is inserted into the first portion of the packet header, and wherein the second portion of the packet header is encrypted). Encrypting the second portion of the packet header further comprises performing an exclusive OR between the second portion of the packet header and the initial vector to generate an initial resulting data item $D_0$ (denoted as resulting data item 74 in FIG. 4), followed by encrypting $D_0$ to generate an initial encrypted data item $E_0$ (denoted as encrypted data item 90 in FIG. 4), said $E_0$ being the encrypted second portion of the packet header. The plaintext data comprises N plaintext-data items (225-1, 225-2, ..., 225-N) denoted as plaintext-data items $T_1$, $T_2$, ..., $T_N$ such that N is at least 1. Generating the encrypted packet for each unencrypted packet further comprises:

in a sequential order of i=1, 2, ..., N, performing an exclusive OR between $T_i$ and $E_{i-1}$ to generate a resulting data item $D_i$, followed by encrypting $D_i$ to form an encrypted data item $E_i$; and combining $E_0, E_1, E_2, \ldots,$ and $E_N$ to form a portion of the encrypted packet.

The above-described encryption system is an example, and it is possible that there are many variations in encryption systems using an initial vector. For example, by implementing the exclusive OR operation between data generated by encrypting one divided data item and an initial vector, the packet encryption unit 310 may generate the result of the operation as an encrypted data item. In this case, the packet encryption unit 310 encrypts the next divided data item by using the encrypted data item as the next vector. Even in this configuration, similarly to the example in FIG. 4, confidentiality of encryption can be enhanced. Processing for encryption of the IP packet 200-2 is similar to that for encryption of the IP packet 200-1.

FIG. 5 shows specific examples of the encrypted communication data 50 in the transmitting system 12 of FIG. 1, in accordance with embodiments of the present invention. The encrypted communication data 50, which is obtained by the above-described encryption illustrated in FIG. 4, includes a MAC frame having the encrypted IP packet 200-1E as a payload, and a MAC frame having the encrypted IP packet 200-2E as a payload. The encrypted IP packet 200-1E includes an encrypted IP header 210-1E and encrypted IP data 220-1E. The encrypted IP header 210-1E is encrypted for each divided data item. However, the encrypted IP header 210-1E includes an unencrypted vector identifier in the identifier field 230-1E. The encrypted IP data 220-1E is encrypted for each divided data item.

Similarly, the encrypted IP packet 200-2E includes an encrypted IP header 210-2E and encrypted IP data 220-2E. The encrypted IP header 210-2E and the encrypted IP data 220-2E are encrypted for each divided data item. However, the encrypted IP header 210-2E includes an unencrypted vector identifier in the encrypted identifier field 230-2E.

Figure 6:
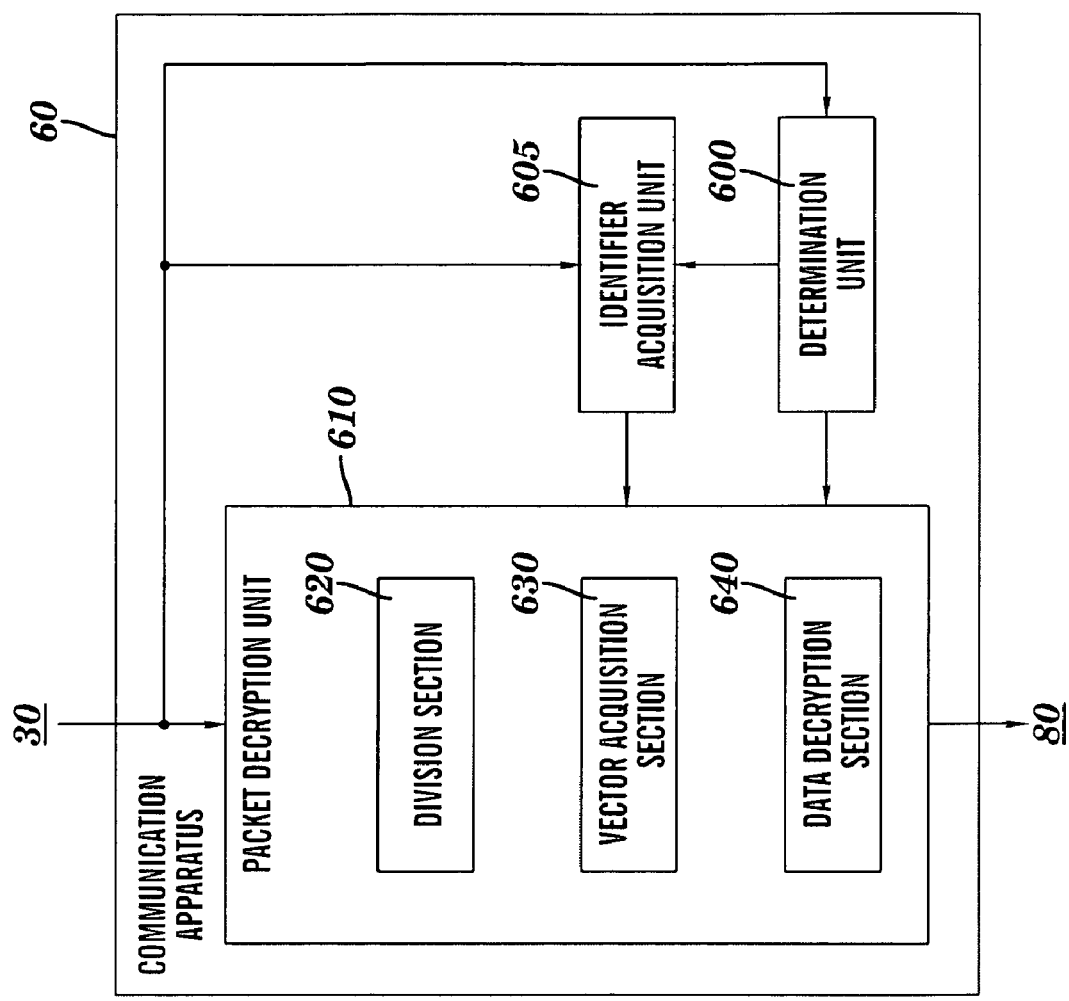
FIG. 6 shows a functional configuration of a communication apparatus in the receiving system of FIG. 1, in accordance with embodiments of the present invention.

FIG. 6 shows a functional configuration of the communication apparatus 60 in the receiving system 14 of FIG. 1, in accordance with embodiments of the present invention. The communication apparatus 60 has a function of controlling layer-2 communication, and also includes a determination unit 600, an identifier acquisition unit 605, and a packet decryption unit 610. The identifier acquisition unit 605 determines whether the payload of the MAC frame received by the communication apparatus 60 is an IP packet. On the condition that the received MAC frame is an IP packet, the identifier acquisition unit 605 acquires a vector identifier identifying an initial vector having been used in encryption of the IP packet, from at least a part of an identifier field provided in the IP header of the encrypted packet. This identifier field is an example of information to be used for reconfiguring the original IP packet from a plurality of divided IP packets. The IP packets generated by dividing the same IP packet have identical values in their identifier fields.

The packet decryption unit 610 generates decrypted data by performing decryption of the encrypted packet by using an initial vector identified by the vector identifier. Specifically, the packet decryption unit 610 includes a division section 620, a vector acquisition section 630, and a data decryption section 640. The division section 620 sequentially divides the encrypted packet into a plurality of divided data items each having a predetermined size. The vector acquisition section 630 acquires an initial vector corresponding to the vector identifier acquired from the identifier field of the encrypted packet. The data decryption section 640 uses the initial vector to decrypt one divided data item, and further decrypts the next divided data item by using the divided data item as the next vector. As a result, the data decryption section 640 can decrypt the divided data items to generate a plurality of decrypted data items.

Figure 7:
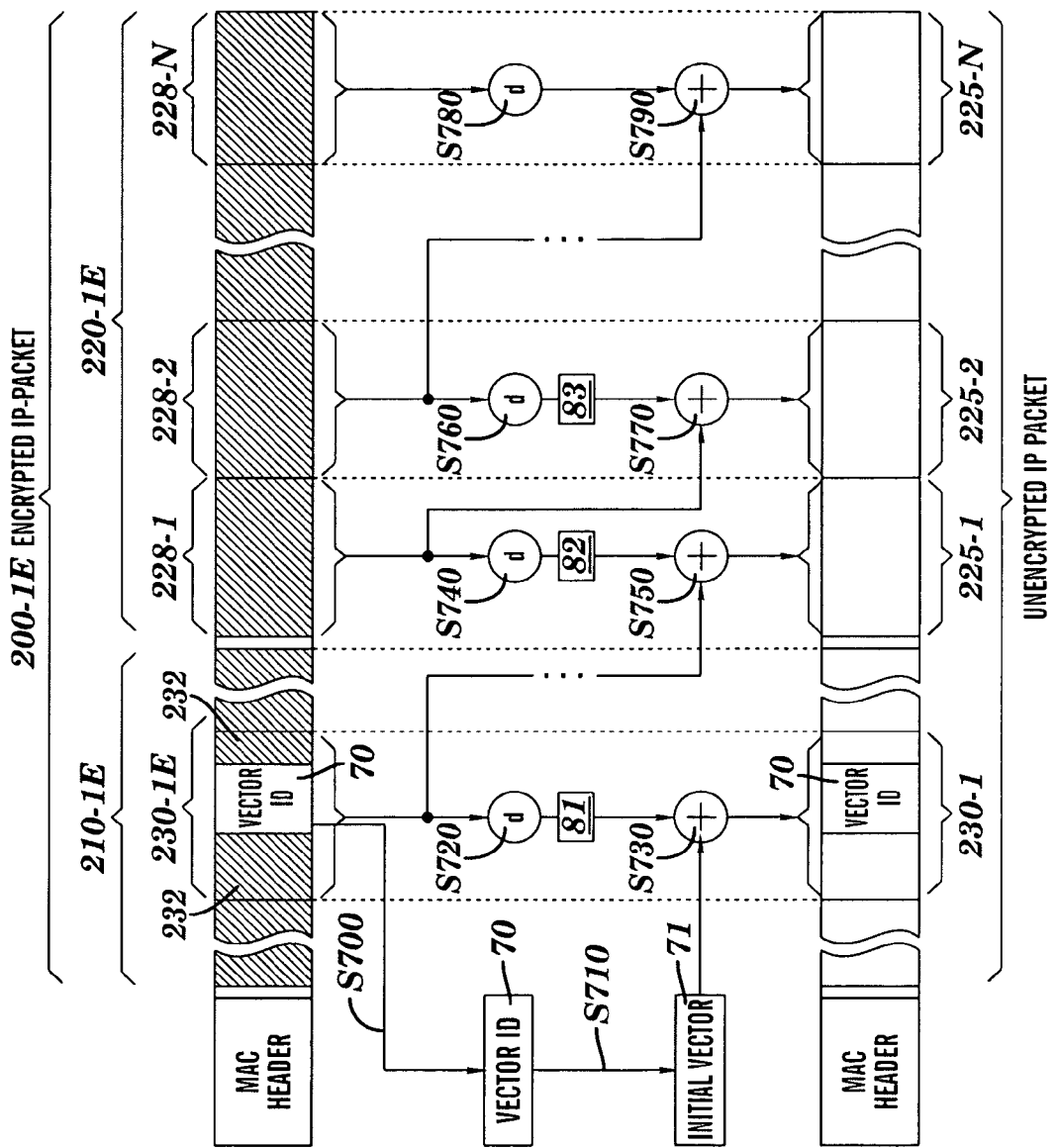
FIG. 7 illustrates a process in which an encrypted IP packet is decrypted by the communication apparatus of FIG. 6, in accordance with embodiments of the present invention.

FIG. 7 illustrates a process in which the encrypted IP packet 200-1E is decrypted by the communication apparatus 60 of FIG. 6, in accordance with embodiments of the present invention. At first, the division section 620 divides the IP header 210-1E and the IP data 220-1E into a plurality of divided data items. The divided data items generated by dividing the IP data 220-1E are represented by encrypted data items 228-1 to 228-N, wherein N is at least 1. In step S700, the identifier acquisition unit 605 acquires a vector identifier from the identifier field 230-1E. Next in step S710, the vector acquisition section 630 acquires an initial vector 71 corresponding to the vector ID 70. The processing that acquires the initial vector 71 from the vector ID 70 may be realized by applying a predetermined hash function to the vector ID 70 as already described.

Next, the data decryption section 640 uses the initial vector 71 to decrypt the encrypted portion of the divided data item (e.g., to decrypt the encrypted part 232 of the identifier field 230-1E shown in FIG. 4) to generate the decrypted data item 81. The data decryption section 640 further decrypts the next divided data item by using the encrypted portion of the divided data item (e.g., the encrypted part 232 of the identifier field 230-1E) as the next vector. This enables the data decryption section 640 to decrypt the divided data items to generate a plurality of decrypted data items. For example in step S720, the data decryption section 640 decrypts the one divided data item 230-1E in the IP header 210-1E. When this divided data item 230-1E includes the vector ID 70, the data decryption section 640 decrypts a part (e.g., the encrypted part 232) of the identifier field 230-1E other than the vector identifier to generate the decrypted data item 81. In step S730, the data decryption section 640 generates the identifier field 230-1 by implementing the exclusive OR operation between the decrypted data item 81 and the initial vector 71. By using one divided data item prior to decryption as the next vector, the data decryption section 640 decrypts the next divided data item.

After finishing decryption in the IP header 210-1E, the data decryption section 640 subsequently performs decryption in the IP data 220-1E. In step S740, the data decryption section 640 decrypts an encrypted data item 228-1 to generate the decrypted data item 82. In step 750, the data decryption section 640 implements the exclusive OR operation between the decrypted data item 82 and the encrypted portion (e.g., the encrypted part 232 shown in FIG. 4) of the data identifier field 230-1E to generate the plaintext-data item 225-1.

Next, the data decryption section 640 decrypts an encrypted data item 228-2 by using the encrypted data item 228-1 as a vector. For example in step S760, the data decryption section 640 decrypts the encrypted data item 228-2 to generate the decrypted data item 83. Step S770 implements the exclusive OR operation between the decrypted data item 83 and the vector consisting of the encrypted data item 228-1 to generate the plaintext-data item 225-2. The data decryption section 640 sequentially repeats the above-described decryption, and finally decrypts an encrypted data item 228-N into a plaintext-data item 225-N in steps S780 and S790. Processing for decrypting the encrypted IP packet 200-2 (said encrypted IP packet 200-2 being generated by the method illustrated in FIG. 4) is substantially similar to that for decrypting the IP packet 200-1E.

The preceding description of FIG. 7 for the decryption of the packet header 210-1E and the encrypted items 228-1, 228-2, . . . , 228-N may be described as follows. The vector identifier is obtained from the identifier field in the encrypted packet header. An initial vector is ascertained from the obtained vector identifier. An encrypted portion ($E_0$) of the encrypted packet header is decrypted to form a decrypted data item $D_0$. An exclusive OR is performed between $D_0$ and the initial vector to form a decrypted packet header of the decrypted packet. The encrypted data items comprise N encrypted data items denoted as encrypted data items $E_1$, $E_2$, . . . , $E_N$ such that N is at least 1. Generating each decrypted packet further comprises:

in a sequential order of i=1, 2, . . . , N, decrypting $E_i$ to form a decrypted data item $D_i$, followed by performing an exclusive OR between $D_i$ and $E_{i-1}$ to generate a plaintext-data item $T_i$; and combining the decrypted packet header, $T_1, T_2, \ldots$, and $T_N$ to form a portion of the decrypted packet.

FIG. 8 shows specific examples of the decrypted communication data 80 in the receiving system 14 of FIG. 1, in accordance with embodiments of the present invention. The communication data 80, which is obtained by the above-described decryption in FIG. 7, includes a MAC frame having the IP packet 200-1 as a payload and a MAC frame having the IP packet 200-2 as a payload. The IP packet 200-1 includes an IP header 210-1 and IP plaintext-data 220-1. The IP plaintext header 210-1 includes a vector identifier in an identifier field 230-1. The IP packet 200-2 includes an IP plaintext header 210-2 and IP plaintext-data 220-2. The IP header 210-2 includes a vector identifier in an identifier field 230-2.

In response to receiving the IP packets 200-1 and 200-2, the communication apparatus 90 reconfigures the original IP packet by using the packet identifiers stored in the identifier fields 230-1 and 230-2. Comparing the communication data 80 with the communication data 20 shown in FIG. 2, it is found that both differ in the packet identifiers stored in the identifier fields 230-1 and 230-2. This is because at least a part of each packet identifier is overwritten by the vector identifier. Therefore, it is also possible that the original IP packet is not reconfigured to its exact original configuration. However, the communication apparatus 90 combines a plurality of IP packets having identical packet identifiers and does not combine a plurality of IP packets having different packet identifiers, regardless of specific contents of the packet identifiers. Since the packet identifiers and the vector identifiers are associated with each other in the storage unit 340 in FIG. 3, the vector ID stored in the identifier field 230-1 and the vector ID stored in the identifier field 230-2 are identical to each other in the communication data 80. Therefore, the communication apparatus 90 can appropriately reconfigure the data communication item (i.e., the original IP packet) by combining the individual decrypted IP packets 200-1 and 200-2.

Figure 9:
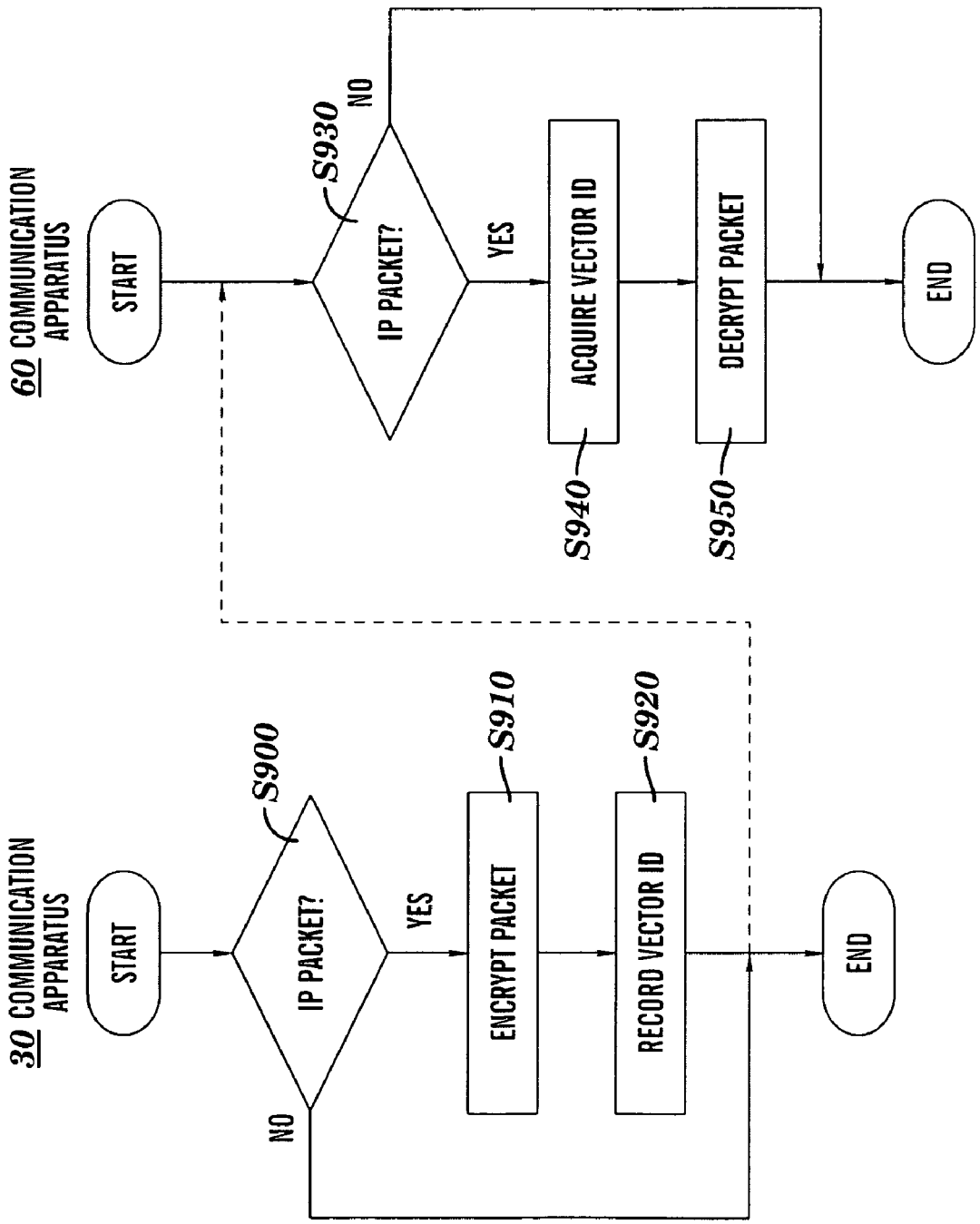
FIG. 9 shows examples of communication flowcharts of the communication apparatuses of FIGS. 3 and 6 in accordance with embodiments of the present invention.

FIG. 9 shows examples of communication flowcharts of the communication apparatuses 30 and 60 of FIGS. 3 and 6, in accordance with embodiments of the present invention. In responding to the communication apparatus 30 receiving the communication data 20 from the communication apparatus 15, the determination unit 300 determines in step S900 whether the payload of the MAC frame included in the communication data 20 is an IP packet. If the payload is an IP packet (S900:YES), then in step S910 the packet encryption unit 310 generates an encrypted packet by encrypting the data packet using an initial vector. In step S920, the vector writing unit 315 records a vector identifier identifying the initial vector in at least a part of the identifier field of the encrypted packet. The MAC frame encrypted in step S910 is transmitted as the communication data 50 from the communication apparatus 30 to the communication apparatus 60.

In responding to the communication apparatus 60 receiving the communication data 50 from the communication apparatus 30, the determination unit 600 determines in step S930 whether the payload of the MAC frame included in the communication data 50 is an IP packet. If the payload is an IP packet (S930: YES), then in step S940 the identifier acquisition unit 605 acquires a vector identifier identifying the initial vector from at least a part of the identifier field in this IP packet. In step S950, the packet decryption unit 610 uses this vector identifier to decrypt the encrypted IP packet, and provides the decrypted packet to the communication terminal 95 via the communication apparatus 90. This realizes communication having high confidentiality between the communication terminal 13 and the communication terminal 95.

As described above according to the information processing system 10 in this embodiment, confidentiality of layer-2 cryptographic communication can be enhanced by using an information field, such as a packet identifier which is used in division and reconfiguration of an IP packet, without hindering processing such as the division and the reconfiguration. This can prevent an increase in data frame size in layer 2, and can eliminate the need to divide and reconfigure a data frame in layer 2. In addition, the encryption system in this embodiment is applicable to various algorithms that need initial vectors. Accordingly, the encryption system in this embodiment can be widely applied not only to an existing algorithm such as CBC, but also to an algorithm that may be developed in the future.

Although the present invention has been described by using an embodiment thereof, the technical scope of the present invention is not limited to the scope described in the foregoing embodiment. It is obvious to persons skilled in the art that the foregoing embodiment may be variously altered or improved. In addition, it is obvious from the description of the scope of Claims that a form obtained by altering or improving the embodiment will also be included in the technical scope of the present invention.

What is claimed is:

1. A method for processing a communication data item, said method comprising the steps of:
dividing the communication data item into a plurality of unencrypted packets, said unencrypted packets being physically isolated from each other, a packet header and plaintext data being contained within each unencrypted packet, the packet header of each unencrypted packet comprising an identifier field that includes a packet identifier, the packet identifier being identical for all of said unencrypted packets; and
generating an encrypted packet from each unencrypted packet by:
determining a vector identifier from the identical packet identifier, said vector identifier having an association with the identical packet identifier;
generating an initial vector from the vector identifier, said initial vector differing from the vector identifier; and
forming an encrypted packet header, said forming the encrypted packet header comprising inserting the vector identifier into a first portion of the packet header and encrypting a second portion of the packet header through use of an encryption key, said first and second portions of the packet header being different portions of the packet header, said encrypting the second portion of the packet header being implemented through use of the initial vector,
wherein said generated encrypted packets are physically isolated from each other.

2. The method of claim 1, wherein the identifier field comprises the first portion of the packet header.

3. The method of claim 2, wherein the identifier field consists of the first portion of the packet header and the second portion of the packet header.

4. The method of claim 2, wherein the second portion of the packet header has a first part that is in the identifier field and a second part that is outside of the identifier field.

5. The method of claim 2, wherein the second portion of the packet header is entirely outside of the identifier field.

6. The method of claim 1, wherein the first portion of the packet header is entirely outside of the identifier field.

7. The method of claim 1, wherein the packet header consists of the first portion of the packet header and the second portion of the packet header.

8. The method of claim 1, wherein said generating the initial vector from the vector identifier comprises applying a specified hash function to the vector identifier which results in the initial vector differing from the vector identifier.

9. The method of claim 8, further comprising deleting the association between the initial vector and the identical packet identifier, in response to the encryption key being changed.

10. The method of claim 1, wherein said generating further comprises for each unencrypted packet:

encrypting the plaintext data through use of the encrypted second portion of the packet header; and combining the encrypted packet header and the encrypted plaintext data to form a portion of the encrypted packet.

11. The method of claim 1, wherein said encrypting the second portion of the packet header comprises performing an exclusive OR between the second portion of the packet header and the initial vector to generate an initial resulting data item $D_0$, followed by encrypting $D_0$ to generate an initial encrypted data item $E_0$, said $E_0$ being the encrypted second portion of the packet header.

12. The method of claim 11, wherein the plaintext data comprises N plaintext-data items denoted as plaintext-data items $T_1, T_2, \ldots, T_N$ such that N is at least 1, wherein said generating for each unencrypted packet further comprises:
in a sequential order of i=1, 2, ..., N, performing an exclusive OR between $T_i$ and $E_{i-1}$ to generate a resulting data item $D_i$, followed by encrypting $D_i$ to form an encrypted data item $E_i$; and
combining $E_0, E_1, E_2, \ldots,$ and $E_N$ to form a portion of the encrypted packet.

13. A computer program comprising computer readable program code, said program code being stored on a computer readable storage medium and adapted to be executed by a processor of a computer system to implement the method of claim 1.

14. A computer system comprising a processor and a computer readable storage medium coupled to the processor, said storage medium containing computer readable program code that when executed by the processor implements the method of claim 1.

15. The method of claim 1, wherein the plurality of unencrypted packets comprises at least three unencrypted packets.

16. A method for processing a plurality of encrypted packets, said method comprising the steps of:
generating a decrypted packet from each encrypted packet of the plurality of encrypted packets, said decrypted packets being physically isolated from each other, said encrypted packets being physically isolated from each other, an encrypted packet header and encrypted data items being contained within each encrypted packet, the encrypted packet header of each encrypted packet comprising an encrypted portion ($E_0$) and an identifier field that includes a vector identifier, said vector identifier being identical for all of said encrypted packets, said encrypted packets having been previously derived from a communication data item that comprised unencrypted packets respectively corresponding to the encrypted packets, said generating comprising for each encrypted packet:
obtaining the vector identifier from the identifier field;
ascertaining an initial vector from the obtained vector identifier, said initial vector differing from the vector identifier;
decrypting $E_0$ to form a decrypted data item $D_0$; and
performing an exclusive OR between $D_0$ and the initial vector to form a decrypted packet header of the decrypted packet.

17. The method of claim 16,
wherein said generating is performed by a receiving system and further comprises for each encrypted packet: decrypting the encrypted data items through use of $E_0$ to form corresponding plaintext-data items and combining the decrypted packet header with the corresponding plaintext-data items to form a portion of the decrypted packet; and
wherein the method further comprises: receiving the plurality of encrypted packets from a transmitting system and combining the decrypted packets to reconstruct the communication data item, said receiving and combining being performed by the receiving system.

18. The method of claim 17, wherein the encrypted data items comprise N encrypted data items denoted as encrypted data items $E_1, E_2, \ldots, E_N$ such that N is at least 1, and wherein said decrypting the encrypted data items comprises:
in a sequential order of i=1, 2, ..., N, decrypting $E_i$ to form a decrypted data item $D_i$, followed by performing an exclusive OR between $D_i$ and $E_{i-1}$ to generate the corresponding plaintext-data item $T_i$.

19. A computer program comprising computer readable program code, said program code being stored on a computer readable storage medium and adapted to be executed by a processor of a computer system to implement the method of claim 16.

20. A computer system comprising a processor and a computer readable storage medium coupled to the processor, said storage medium containing computer readable program code that when executed by the processor implements the method of claim 16.

* * * * *